United States Patent [19]

Furness

[11] 4,088,409
[45] May 9, 1978

[54] OPTICAL ROLL ALIGNMENT DEVICE

[75] Inventor: Bernard J. Furness, Sheffield, England

[73] Assignee: British Steel Corporation, London, England

[21] Appl. No.: 703,703

[22] Filed: Jul. 8, 1976

[30] Foreign Application Priority Data

Jul. 18, 1975 United Kingdom ............... 30270/75

[51] Int. Cl.$^2$ .................... G01B 11/27; B21C 51/00
[52] U.S. Cl. ........................................ 356/153; 72/37; 356/154
[58] Field of Search ............... 356/142, 153, 154, 156, 356/247, 253-255; 72/37; 33/286

[56] References Cited

U.S. PATENT DOCUMENTS

| 2,422,181 | 6/1947 | Brown | 356/247 |
| 3,834,820 | 9/1974 | Bock | 356/156 |

FOREIGN PATENT DOCUMENTS 1,056,194  1/1967  United Kingdom ................ 356/153

*Primary Examiner*—John K. Corbin
*Assistant Examiner*—Wm. H. Punter
*Attorney, Agent, or Firm*—Bacon & Thomas

[57] ABSTRACT

This invention relates to an optical roll alignment device for aligning a roll pass in a bar/rod or section mill both with respect to the mating roll grooves themselves and an entry guide.

The device comprises optical means housed in a guide including a system of mirrors or prisms for providing an image of only the shoulders of the mating roll grooves, a lens system for magnifying the image and a screen or eyepiece in which the image is viewed, together with coordinates of the guide housing whereby any misalignment between the guide and the roll pass may be observed and corrected.

10 Claims, 4 Drawing Figures

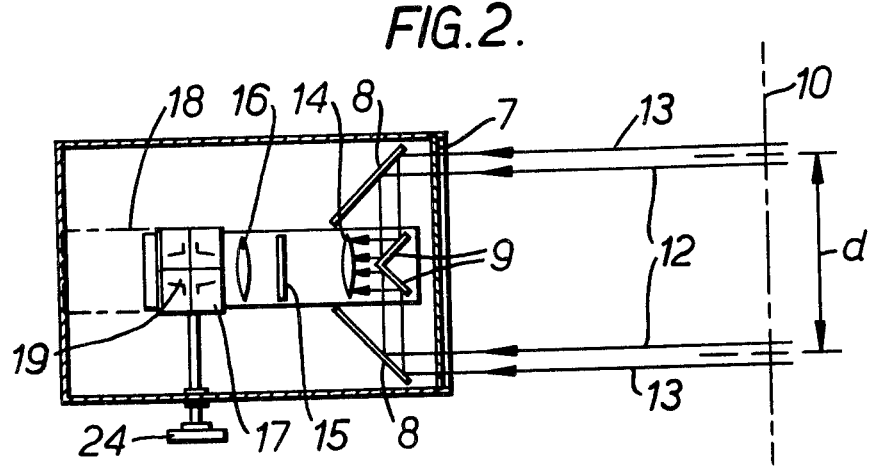
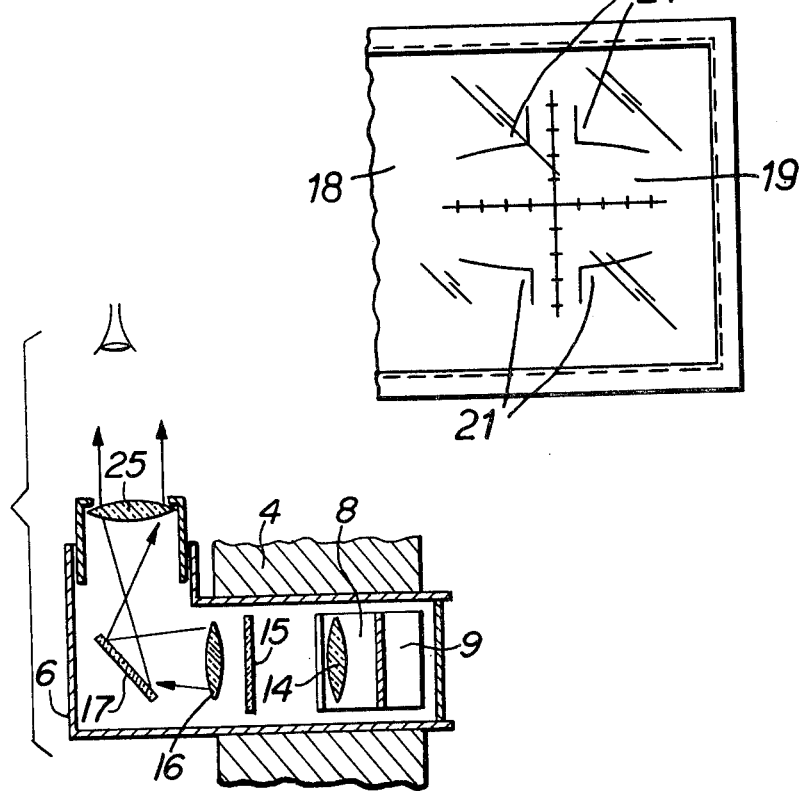

OPTICAL ROLL ALIGNMENT DEVICE

This invention relates to an optical roll alignment device for aligning in a rolling mill a roll pass (mating roll grooves or 'holes') in a bar/rod or section mill both with respect to the mating roll grooves themselves and an entry guide therefor. The entry guide itself is usually in the form of a cassette—for accommodating the appropriate bar etc.—designed to be a precision fit in the entry guide housing and co-incident therewith.

According to the present invention there is provided a device for aligning in a rolling mill a roll pass with an entry guide therefor, comprising optical means adapted to be inserted in the guide housing and including a reflective system for providing an image of only the shoulders of the mating roll grooves, the image showing lateral spacing of opposite pairs of shoulders closer together than their actual spacing, a lens system for magnifying the image and a viewing system by which the image is viewed together with co-ordinates of the guide housing whereby any misalignment between said housing and the roll pass may be observed and corrected.

The reflective system may comprise first and second pairs of mirrors, the mirrors in each pair being set at right angles symmetrically with respect to a common plane normal to the plane containing the axes of the rolls, the first pair spanning a width wider than the widest pass to be viewed and the second pair facing the first pair between said first pair and the rolls and spanning a width smaller than the smallest pass to be viewed.

Alternatively prisms may be adopted instead of mirrors. The lens system may comprise an objective lens and a second lens with crosswires defining central co-ordinates of the guide housing between them at the focus of the image from the objective. A mirror may be provided for reflecting the image from the second lens on to the viewing system at an angle convenient for observation. The latter system may comprise a screen or an 'eyepiece' lens. Alternatively the lens system may simply comprise the objective and the viewing system the eyepiece, the mirror being sited between them. Other combinations, e.g. the second lens between the mirror and the viewing system, or even a multiplicity of composite or individual lenses on one or either side of the mirror, may equally well be adopted in the 'optical means'.

The lens system together with the second pair of mirrors (or prisms) may be movable in common whereby to vary the aspect viewed and cater for different pass widths. For this purpose if the screen is employed it may be elongated to accommodate the different image sitings.

A bright source of light is provided for illuminating the roll pass.

In accordance with this invention then, provision is made for optically viewing only the relevant parts of the roll pass necessary to effect correction and alignment, namely the roll pass shoulders, thus enabling by this split image technique large modifications to be achieved for accurate adjustment, e.g. 10 times. Magnification to this level by a lens system only would require a much larger screen which could not readily be adopted for the purpose of this invention since of course the whole pass aperture would be enlarged whereas it is only the shoulders which provide the 'information' necessary for alignment. The magnification of the device is pre-set and no adjustment is necessary for focus throughout the range of travel of the device.

In order that the invention may be fully understood, one embodiment thereof will now be described, by way of example, with reference to the accompanying drawings; in which:

FIG. 2 is part-sectional plan view of FIG. 1;

FIG. 3 is a fragmentary view of the screen of the device illustrating a typical image with the pass accurately aligned and;

FIG. 4 is a part-sectional side elevation of a modification of the device whereby an eyepiece lens is provided instead of the screen for viewing.

Figure 1:
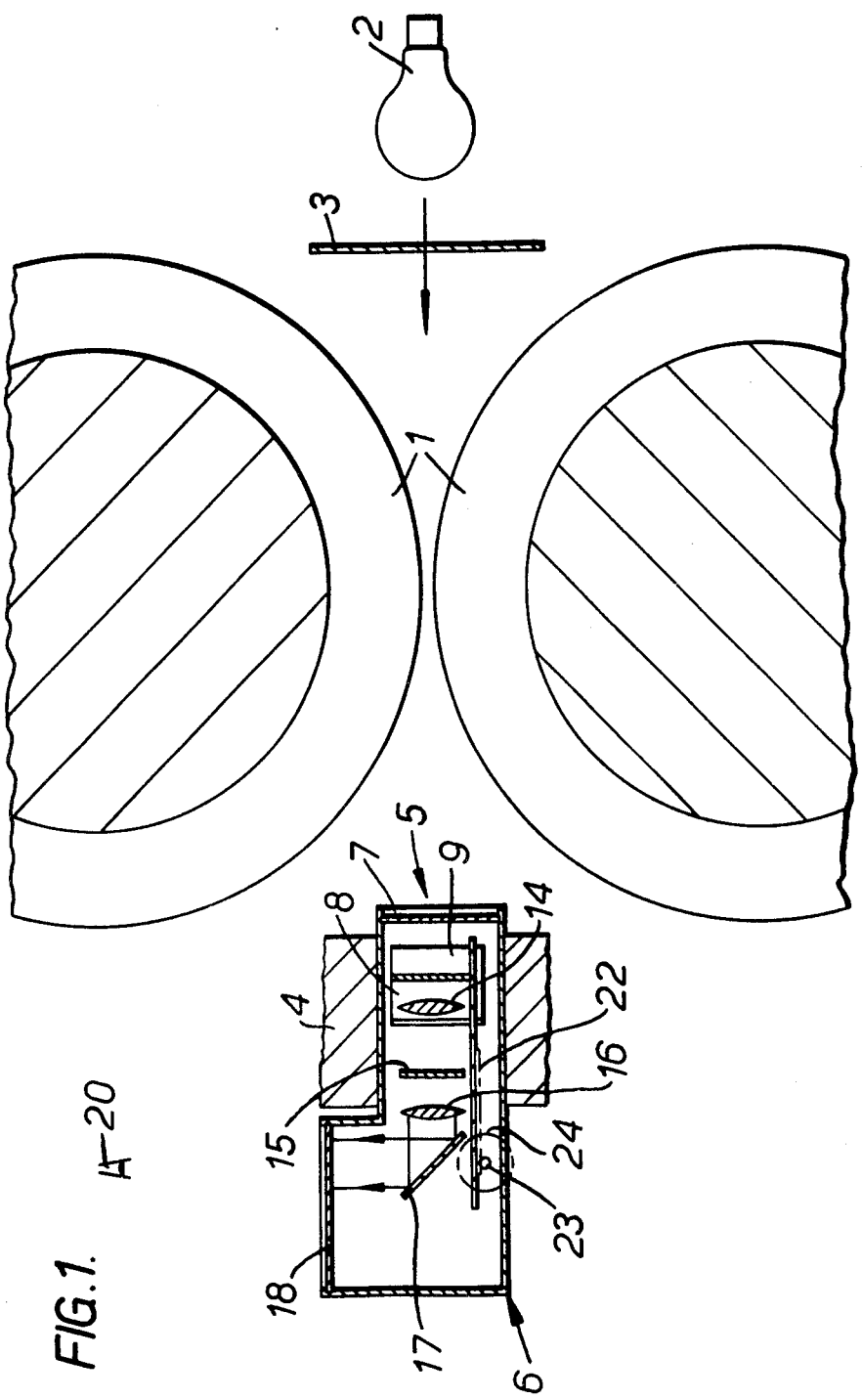
FIG. 1 is a part-sectional side elevation of the device mounted in an entry guide housing in a rolling mill (illustrated schematically)

Referring now to FIGS. 1 and 2 a pair of horizontally mounted semi-circularly grooved rolls 1 are illuminated on one side by a tungsten halogen lamp 2 through a diffuser 3 and the roll alignment device is mounted on the other side in an entry guide housing 4 for the rod/bar as appropriate.

More particularly, the device comprises a rectangular-section 'nose' portion 5 for accurate alignment in the body of the guide housing 4 and a protruding 'after' portion 6 on which the image of the pass is viewed. The nose has a plain glass window 7 sealing the device from the ingress of dirt behind which lie two pairs of mirrors 8, 9 each pair being at right angles to one another and lying symmetrically with respect to a common plane normal to the plane 10 containing the axes of the rolls 1. The widths of the mirror 8 are such as to span a distance wider than the widest pass to be viewed (exemplified as distance $d$) but the height of these mirrors is considerably less than the height of the pass. The total span of the mirrors 9, which face the mirrors 8 and are parallel to them, is smaller than the smallest pass to be viewed. In practice, the device would be advanced to lie as closely as possible to the plane 10 but this has not been depicted in the drawing in the interests of clarity.

Light rays 12 from within the pass and from the shoulder thereof (13) are depicted as the limiting ones to be reflected in parallel fashion from the mirrors 9 via mirrors 8. These are incident on an objective lens 14 and are brought to a focus in a plane containing a plain glass screen 15 on which crosswires are engraved. This graticule defines the central co-ordinates of the entry guide housing 4. The image on screen 15 shows the lateral spacing of opposite pairs of shoulders closer together than their actual spacing due to the arrangement of mirrors 9 and 8. In turn, the image on this screen is magnified by a second lens 16 and reflected by a mirror 17 on to an elongated ground glass screen 18 on which the image 19 can be viewed by the eye (20).

FIG. 3 shows the image screened in more detail, identifying the four roll shoulders 21 of the pass and the co-ordinate crosswires.

In order to accommodate different pass widths the mirrors 9 are movable towards and away from the mirrors 8 so that rays emerging from smaller pass widths (within the distance $d$) are reflected on to the mirrors 9 in the same fashion as the rays shown. This movement is effected in common with the succeeding optical system and for this purpose the mirrors 9, the lenses 14 and 16, the glass graticule 15 and the mirror 17 are mounted on a rack 22 movable by a pinion 23 secured to a handwheel 24 accessible to the operator. The image 19 moves along the screen 18 during this handwheel adjustment for which purpose the screen is elongated.

Because the sum of the distances of the rays 12 between the object plane and the mirrors 9, via mirrors 8, is always equal to the sum of the distances of the rays 13 between these elements the image of the object is always formed in the plane of the crosswires; no focus adjustment is therefore required with this device throughout its range of travel.

With the four shoulders displayed on the screen in the fashion described lateral adjustment of one or other of the rolls 1 may be effected to bring the 'pass' into line, i.e. alignment of the shoulders with one another, followed by displacement of both rolls together horizontally and vertically to line them up with the crosswire co-ordinates. The roll pass is then completely aligned with the entry guide box. The device may then be removed from the housing 4 and replaced by a pre-set guide cassette pre-set such that the rod/bar stock is fed centrally to the rolls.

Although this invention has been described with reference to the particular arrangement illustrated it is to be understood that various modifications may readily be effected without departing from the scope of the invention. For example, since only the horizontal co-ordinate defining the centreline between the rolls is effectively movable along the screen by adjustment only this co-ordinate need strictly be inscribed on the glass screen 15; the other co-ordinate could be inscribed on the screen 18. Further, a wire could be used instead of an inscribed glass for this horizontal co-ordinate.

A multiplicity of lenses could of course be used for effecting the requisite degree of magnification and image inversion if required, or to restrict the overall dimensions of the device commensurate with large magnification factors required the necessary focal length may be 'folded' in the normal manner by the use of prisms or other reflecting surfaces. As mentioned, a prismatic system could also be used instead of the mirrors 8, 9 and an eye-piece lens (25) instead of the screen 18.

I claim:

1. A device for aligning a roll pass with an entry guide therefor in a rolling mill having an entry guide housing comprising
    optical means insertable in the guide housing and including
    means for displaying co-ordinates of the guide housing,
    a reflective system for providing an image of only the shoulders of the mating roll grooves, the image showing lateral spacing of opposite pairs of shoulders closer together than their actual spacing,
    a lens system for magnifying the image and
    a viewing system by which the magnified image is viewed together with the co-ordinates of the guide housing whereby any misalignment between said housing and the roll pass may be observed and corrected.

2. A device according to claim 1 wherein the reflective system comprises
    first and second pairs of reflecting surfaces, the said surfaces in each pair being set at right angles symmetrically with respect to a common plane normal to the plane containing the axes of the rolls, the first pair spanning a width wider than the widest pass to be viewed and the second pair facing the first pair between said first pair and the rolls and spanning a width smaller than the smallest pass to be viewed.

3. A device according to claim 2, wherein the lens system comprises
    an objective lens at the focus of which is provided a graticule defining the said co-ordinates.

4. A device according to claim 3, wherein the viewing system comprises
    a screen.

5. A device according to claim 3, wherein the viewing system comprises
    an eyepiece lens.

6. A device for aligning a roll pass with an entry guide therefor in a rolling mill having an entry guide housing, comprising
    optical means insertable in the guide housing and including
    means for displaying co-ordinates of the guide housing,
    a reflective system for providing an image of only the shoulders of the mating roll grooves, said reflective system comprising
    first and second pairs of reflecting surfaces, the said surfaces in each pair being set at right angles symmetrically with respect to a common plane normal to the plane containing the axes of the rolls, the first pair spanning a width wider than the widest pass to be viewed and the second pair facing the first pair between said first pair and the rolls and spanning a width smaller than the smallest pass to be viewed,
    A viewing system, and
    a lens system including
    an objective lens for magnifying the roll groove shoulders and
    a further reflecting surface between the objective lens and the viewing system for reflecting the image thereto at an angle convenient for viewing, the image together with the co-ordinates of the guide housing being displayed on said viewing system whereby any misalignment between said housing and the roll pass may be observed and corrected.

7. A device according to claim 6, wherein the reflecting surfaces comprise mirrors.

8. A device according to claim 6, wherein the means for displaying the co-ordinates of the guide housing comprises
    a graticule, said graticule lying at the focus of the objective lens.

9. A device according to claim 8 comprising
    a mechanism whereby the lens system is movable relatively to the viewing system to vary the aspect viewed in the viewing system.

10. A device according to claim 6, wherein the optical means is housed in a body, said body having
    a nose portion insertable axially into an aperture defining the guide housing.

* * * * *